(No Model.)
J. BROCKWAY.
Evaporator.
No. 231,756. Patented Aug. 31, 1880.
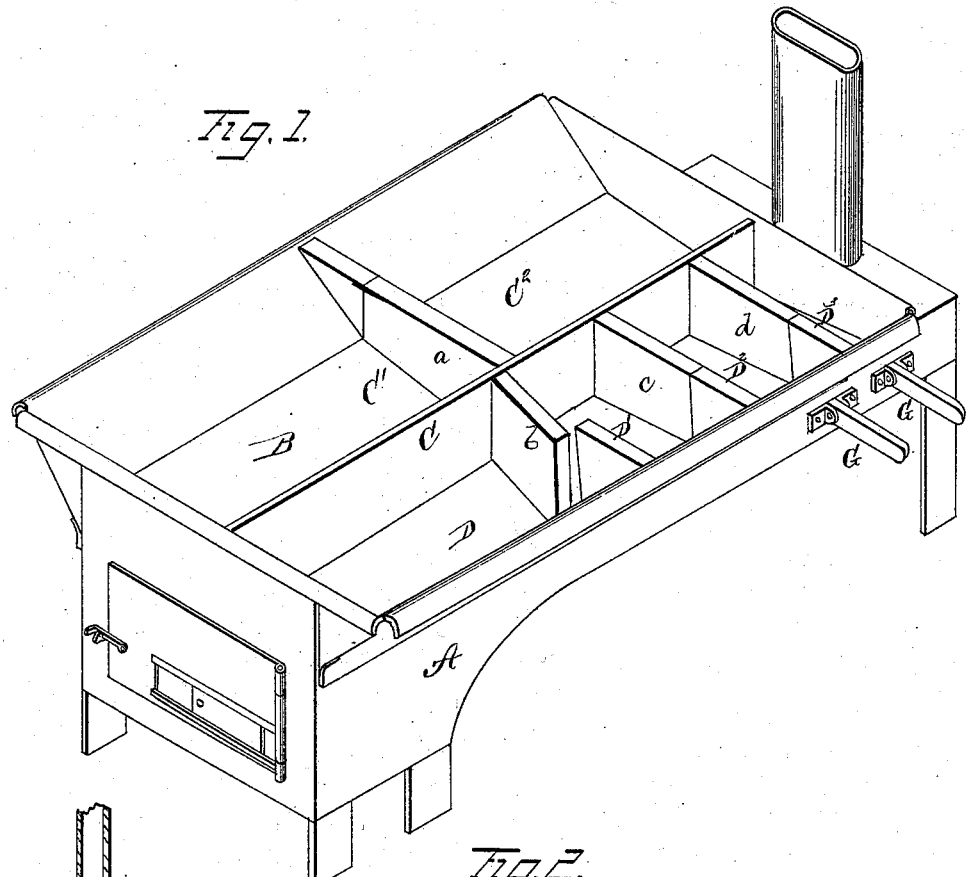
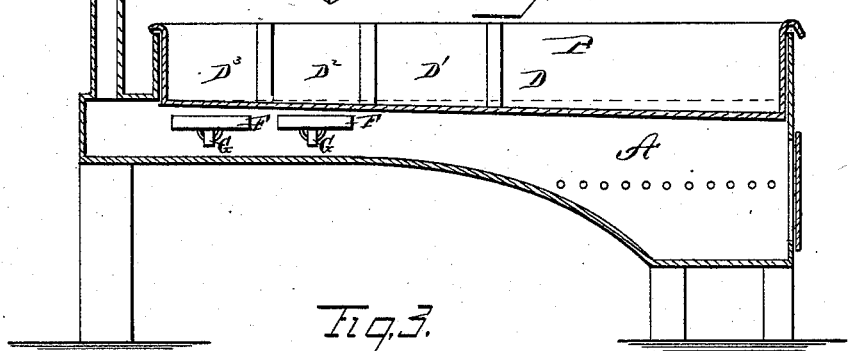
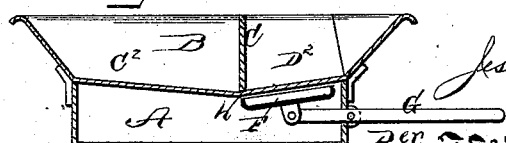
Witnesses:
H. C. McArthur
John C. Rogers
Inventor,
Jesse Brockway
per T. H. Alexander
Attorney.

UNITED STATES PATENT OFFICE.

JESSE BROCKWAY, OF OSWEGO, ILLINOIS.

EVAPORATOR.

SPECIFICATION forming part of Letters Patent No. 231,756, dated August 31, 1880.

Application filed March 20, 1880. (No model.)

*To all whom it may concern:*

Be it known that I, JESSE BROCKWAY, of Oswego, in the county of Kendall and State of Illinois, have invented certain new and useful Improvements in Evaporators; and I do hereby declare that the following is a full, clear, and exact description thereof, reference being had to the accompanying drawings, and to the letters of reference marked thereon, which form part of this specification.

The nature of my invention consists in constructing an evaporating-pan with its bottom inclined from both sides toward the center and providing it with a longitudinal partition, extending from end to end of the pan along the line of its greatest depth, and subdividing the two chambers thus formed into smaller chambers of varying size by means of partitions and movable gates; also, in such other features as will be more specifically set forth in the claim.

In order to enable others skilled in the art to which my invention appertains to make and use the same, I will now proceed to describe its construction and operation, referring to the annexed drawings, in which—

Figure 1 is a perspective view of my evaporator. Fig. 2 is a longitudinal vertical section, and Fig. 3 a transverse vertical section, thereof.

A represents a furnace of any of the well-known forms, made of iron, brick, or stone.

B represents the evaporator-pan, divided by a longitudinal partition, C, into two compartments, one of which is wider than the other. The wider compartment is, by a cross-partition, divided into two chambers, C' and C², while the narrower part is, by other partitions, divided into chambers D, D', D², and D³, of varying size. The widest side is for the entrance of juice at the rear end, where the juice comes in continually, and the greater part of the scum and impurities is removed. Thence it is dipped into the chamber D as it is needed.

The various partitions across the two compartments are provided with gates marked respectively $a$, $b$, $c$, and $d$.

From the chamber D the juice is passed through the gates gradually into the other compartments or chambers until it is finished in the chamber D³.

The object of making one side wider is to obtain increased surface, so as to boil down the juice more rapidly.

The bottom of the pan B is inclined from both sides toward the center, as shown at $h$, in order to keep the juice from burning. As the juice thickens most over the hottest fire, this slant or pitch gives the thin juice a chance to thicken by returning to the center.

The movable gates $b$ $c$ $d$ are to keep the juice separated in the different stages of boiling, and for moving the sirup toward the rear end as fast as it thickens.

The partition and gate $a$ is used merely for convenience in boiling juice for different persons.

At the rear end, under the chambers D² D³, are dampers F F, to control the heat and prevent burning the sirup while finishing. Each damper F is pivoted on the inner end of a lever, G, which passes through and is pivoted in the wall of the furnace. When the bottoms of these compartments become too hot the dampers are thrown up against them, and, being of a size sufficient to fully cover them, the juice contained therein is protected from scorching. They may be held in this position by any suitable means. For instance, a stake may be driven into the ground beside them and provided with a pin and series of holes for holding the levers G G at any point desired.

By this construction of the pan I avoid the scorching or burning of the sirup in any stage of process, upon which depends the purity and color of the sugar or molasses.

I am aware that the state of the art shows the individual features of my pan to be old, and I therefore lay no claim to any one of them *per se.*

Having thus fully described my invention, what I claim as new, and desire to secure by Letters Patent, is—

The pan B, having longitudinal partition C extending from end to end, and the bottom inclined from the sides to the partition, said compartments being divided into chambers of varying sizes by partitions having movable gates, in combination with furnace A, provided with dampers F F corresponding with the areas of chambers $D^2$ $D^3$, all constructed, arranged, and operating in the manner and for the purpose set forth.

In testimony that I claim the foregoing as my own I herewith affix my signature in presence of two witnesses.

JESSE BROCKWAY.

Witnesses:
 JOHN W. TERRY,
 WILLIAM ANDERSON.